Jan. 8, 1952     R. J. GRAY     2,581,587
ENDLESS TRACK
Filed March 26, 1949     3 Sheets—Sheet 1
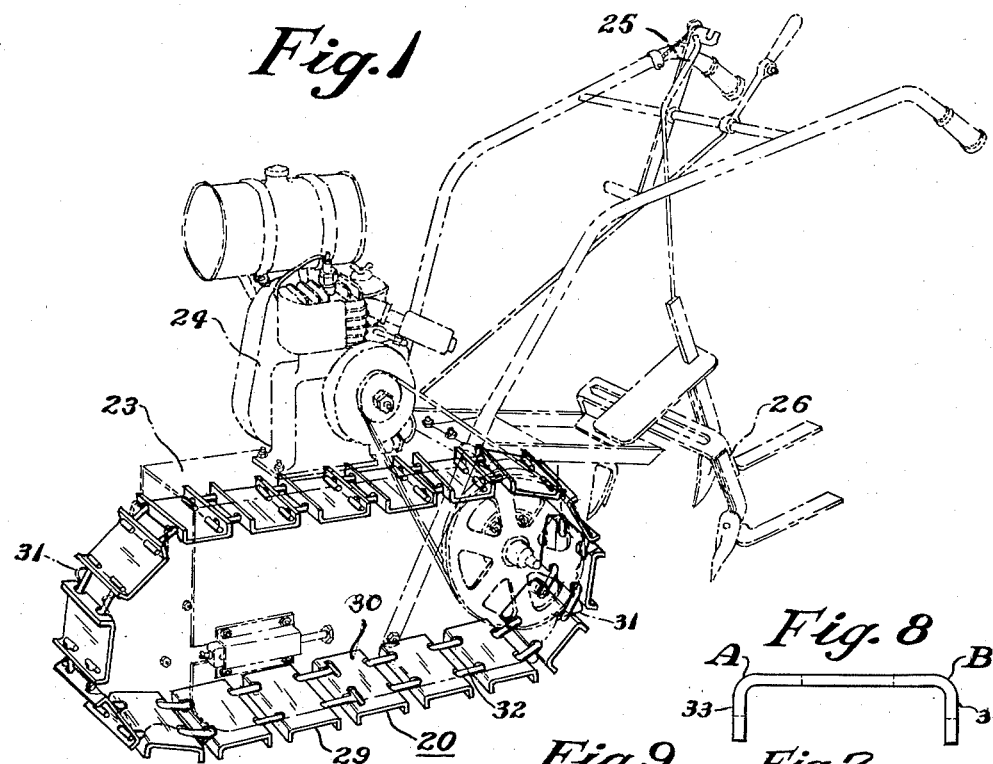
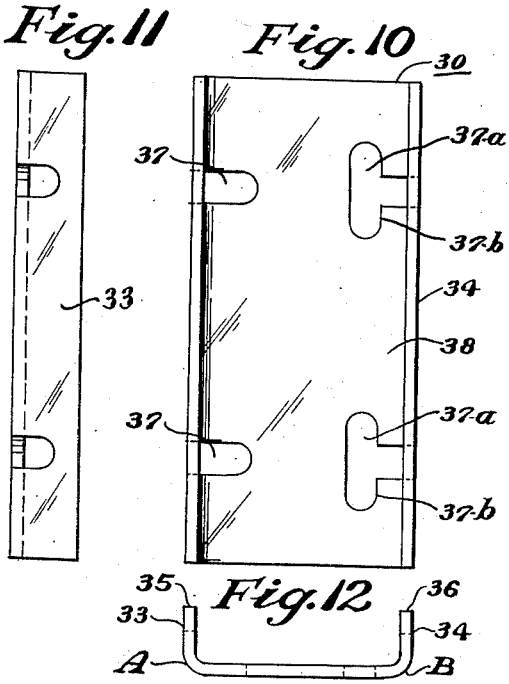
INVENTOR.
Russell J. Gray
BY
Leonard L. Kalish
Attorney

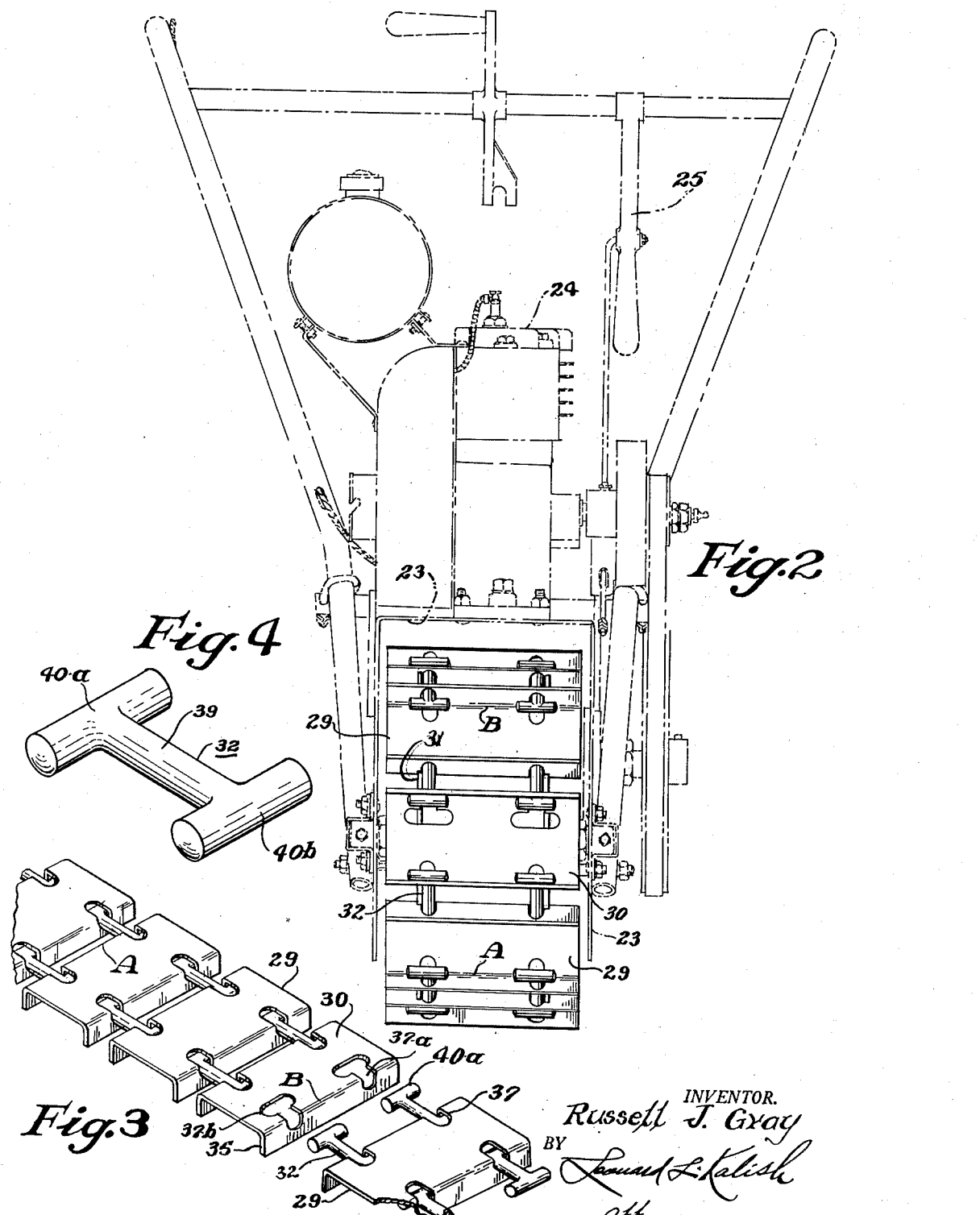

Jan. 8, 1952  R. J. GRAY  2,581,587
ENDLESS TRACK
Filed March 26, 1949  3 Sheets-Sheet 3
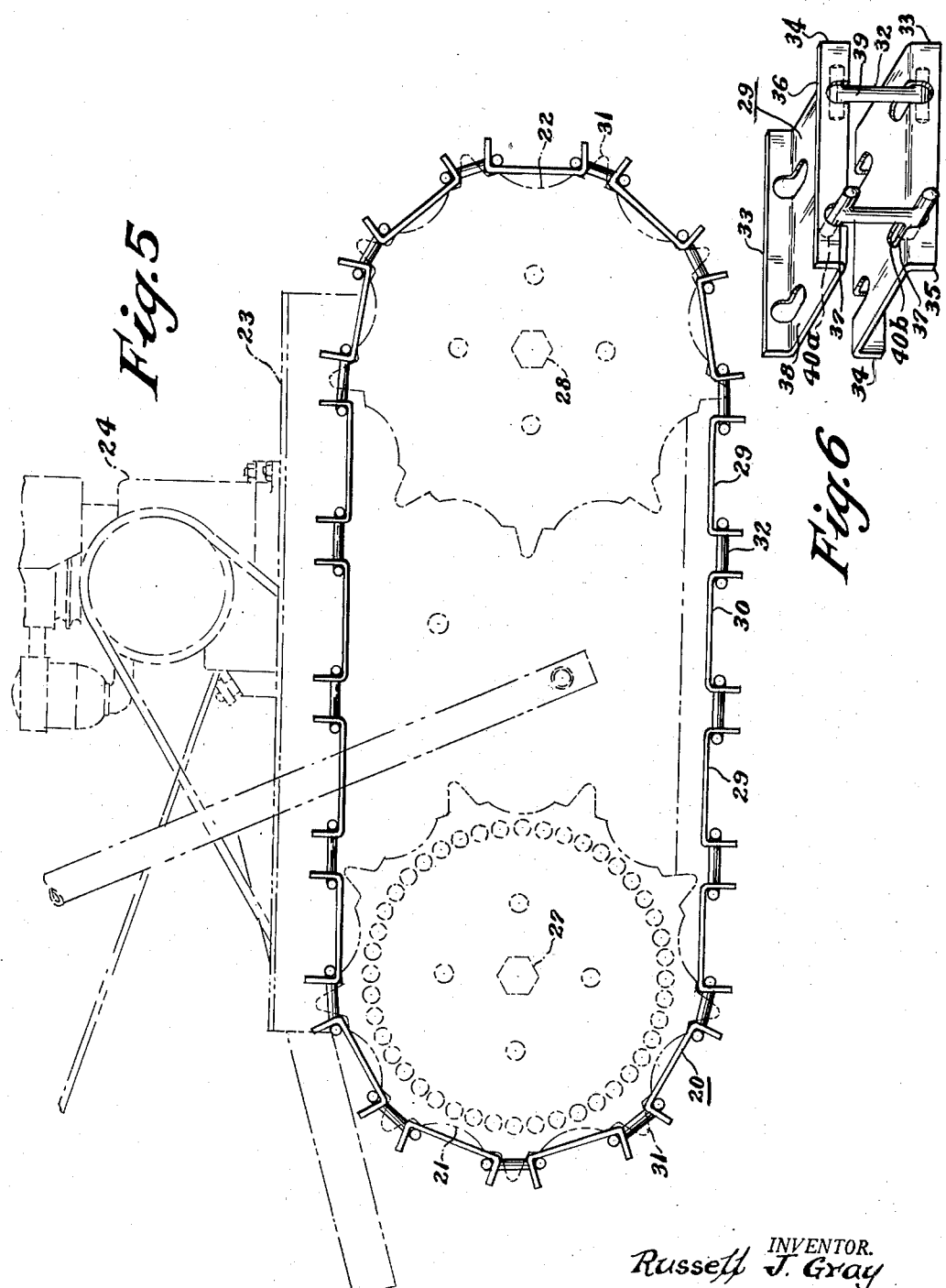
INVENTOR.
Russell J. Gray
BY
Leonard L. Kalish
Attorney Patented Jan. 8, 1952

2,581,587

UNITED STATES PATENT OFFICE 2,581,587

ENDLESS TRACK

Russell J. Gray, Meadeville, Minn.

Application March 26, 1949, Serial No. 83,709

5 Claims. (Cl. 305—10)

This invention relates to mobile equipment including tractors and other self-propelled units, as well as non-powered trailer vehicles, having earth-contacting devices of the endless-track or caterpillar variety, and more specifically to the endless-track used in such equipment.

An object of the present invention is to provide an endless-track which is sturdy, efficient, inexpensive to produce, easy to assemble and which is quickly dismantled, as well as a novel method of assembling and disassembling the same.

A further object of the present invention is to provide an endless-track, composed of novel ground-contacting pads or plates and connector links or elements, wherein the connector links or elements are integral units forged or cast or otherwise formed as one-piece members.

A further object of the present invention is to provide a ground-contacting pad for an endless-track which is simple and inexpensive to fabricate and which is readily replaced when worn.

Another object of the present invention is to provide a connector element or link, for use with an endless-track, which link can be inserted or removed from said track with little labor and few tools.

In all types of endless-track or caterpillar constructions employed in tractors or the like (wherein it is desirable to spread vehicle-weight over a large ground-area to prevent sinking-in and/or to give greater pulling power), the individual plates or pads are provided with more or less transversely-extending ridges or cleats or other similar ground-gripping portions which become worn after prolonged use so as to require replacement in order to maintain maximum efficiency. Since the wear is not always uniform, and since single pads are sometimes damaged, it frequently becomes necessary to replace one or more individual plates or pads instead of replacing the entire endless-track.

It is therefore desirable to provide an endless-track or caterpillar construction wherein individual plates or pads can be quickly and easily detached from the complete chain or loop in order to permit their replacement.

Conventional constructions heretofore employed have utilized threaded bolt-and-nut elements as the interconnecting means between the plates or pads. These bolt-and-nut connections have not proven entirely satisfactory since the threads tend to become jammed or stripped or worn from contact with the ground or with stones or other hard objects during use so that it is virtually impossible to unscrew the nut from the bolt and, instead, it is necessary to cut the bolt to effect a separation. This is undesirable not only from the standpoint of expense of replacing the interconnecting elements but also from the standpoint that it requires special cutting tools and considerable additional labor every time it becomes necessary to replace one or more of the plates or pads.

The endless-track or caterpillar construction of the present invention permits quick and easy dis-assembly of the individual plates or pads by utilizing novel one-piece interconnecting elements which effectively hold the plates in proper relationship during use and which can be quickly and easily maneuvered so as to free the plates or pads when it is desired to separate them, and which can be manufactured at extremely low cost, due to the fact that they do not require threading or other accurate machining operations such as make up the bulk of the cost of a conventional bolt-and-nut, for example.

Generally speaking, the present invention contemplates an endless-track or caterpillar construction (for mobile equipment, including tractors and other self-propelled units as well as non-powered trailer units) made up of a series of one-piece relatively heavy-gauge sheet metal plates having their front and rear edges bent outwardly along transverse fold-lines to provide upstanding cleats and having one or more slots or openings formed so as to extend across each fold-line, and a plurality of connecting elements or links which are formed as more or less integral one-piece members, each link being generally H-shaped and being constructed and arranged to be fitted into a pair of slots formed on adjoining plates so as to connect the plates while, at the same time, being capable of quick and easy removal from the slots by simple turning operations when the endless-track or caterpillar is slackened.

For the purpose of illustrating the invention, there is shown in the accompanying drawings one form thereof which is at present preferred, although it is to be understood that the various instrumentalities of which the invention consists can be variously arranged and organized and that the invention is not limited to the precise arrangements and organizations of the instrumentalities as herein shown and described.

In the drawings, in which like parts are designated by like reference characters:

Figure 1 represents a perspective view of an endless-track of the present invention, as it might be used with a single-track hand-operated garden tractor or the like.

Figure 2 represents a front elevational view of the endless-track of the present invention as it might be used with the single-track hand-operated garden cultivator of Figure 1.

Figure 3 represents a top perspective view of a number of ground-contacting elements or pads or plates joined together by a multiplicity of connector links.

Figure 4 represents a perspective view of a connector link of the present invention.

Figure 5 represents a side elevational view of an endless-track of the present invention as it might be used with the single-track hand-operated garden cultivator of Figure 1.

Figure 6 represents a perspective view showing the manner of assembly of two ground-contacting pads using two of the connector links of the present invention.

Figure 7 represents a plan view of one ground-contacting pad or element.

Figure 8 represents an end elevational view of the ground-contacting pad shown in Figure 7.

Figure 9 represents a side elevational view of the ground-contacting element shown in Figure 7.

Figure 10 represents a plan view of another ground-contacting pad or element.

Figure 11 represents a side elevational view of the ground-contacting element shown in Figure 10.

Figure 12 represents an end elevational view of the ground-contacting element shown in Figure 10.

The endless-track of the present invention is intended primarily for use with small power-driven hand-operated pieces of equipment such as garden-tractors or the like, but may be adapted equally well for use with any mobile unit requiring endless-track supports. Thus, as is shown in Figures 1, 2 and 5, the vehicle 20 may incorporate therein a number of sprocketed wheels 21 and 22. These wheels 21 and 22 may support an open box-like member or frame 23 upon which may be mounted a source of power, such as a gasoline motor 24. In addition, suitable controls 25 and tools 26 may be mounted upon the frame, all in the manner described in my co-pending patent-application bearing Serial No. 750,833, filed on May 27, 1947, now abandoned. Inasmuch as the present invention specifically relates to an endless-track, per se, I will not describe in detail the operation or construction of the various elements which cause the wheels 21 and 22 to rotate.

The wheels 21 and 22 are operatively connected to the frame 23 in a manner which allows one axle, such as the front axle 27 to be adjusted horizontally with relation to the rear axle 28. This construction permits the endless-track 20 to be slackened or the tension between the various elements thereof relieved, for a purpose to be hereinafter explained in further detail. However, the tension can be increased or decreased by the use of an idler wheel or other means, well known to those skilled in the art, and I do not mean to limit myself to any particular method of increasing or decreasing the tension between the elements of the chains 20.

The track 20 consists of a number of basic pads or plates 29, and a single master pad 30. The basic pad 29 is shown in Figures 7–9, while the master pad 30 is shown in detail in Figures 10–12.

Each of the pads 29 and 30 is formed from a rectangular piece of heavy guage form-retaining sheet-metal (such as #7 gauge steel) which may be case hardened or otherwise treated so as to be highly resistant to wear.

A multiplicity of forged links 32 connect the pads 29 and 30 so as to form an endless belt or chain passing between and around the sprocketed wheels 21 and 22. Thus, when assembled, the links 32 and the pads 29 and 30 form an endless belt wherein two of the links 32 connect each pad 29 (or 30) to each of the pads, next in front and next behind itself.

Each of the pads 29 and 30 is generally U-shaped and is formed by bending the sheet-steel plate along transverse parallel lines A and B to provide a main body portion having transverse upturned ends or cleats 33 and 34 at its front and rear edges. The cleats 35 and 36 are adapted to engage and dig into the ground as the track is in use, thus providing relatively sharp cutting surfaces which afford increased traction for the tractor or vehicle employing the endless-track of the present invention.

Four elongated slots 37 are punched or otherwise formed in the pads 29 prior to the bending of the ends 33 and 34 thereof. The slots 37 are punched in the sheet-metal plates with the major axis thereof intersecting the lines A and B at right angles and with approximately one-third of the length of said slots lying between the line A (or B) and the edges of the plates, that is, along the upturned ends. These slots are each adapted to receive one end of a link 32, as will be hereinafter described.

The fabrication of the master pad 30 is similar to the procedure followed in the formation of the pad 29 with the exception that two of the slots 37-a are T-shaped when punched in the flat metal. After the upstanding end 34 is formed, the head of the T 37-b appears in the body portion 38 of the pad, whereas the vertical portion of the T terminates along the upstanding end 34.

The links 32, heretofore referred to, may be generally H-shape and may be made of forged steel, or other material which is shock-resistant and durable. The diameter of the shank 39 and of the ends 40-a and 40-b is slightly less than the width of the slots 37 or 37-a. The length of the shank 39 may be of any convenient size; however, I prefer that this shank be approximately one-half the width of the body portion 38 of the pads 29 and 30. The length of the ends 40-a and 40-b of the links 32 is somewhat less than the length of the head of the T-shaped slot 37-b. Thus, as is shown particularly in Figures 3 and 6, the links 32 will fit easily into the slots 37 and 37-a.

As is shown particularly in Figures 1, 2, 3 and 5, the endless-track of the present invention is formed of a series of the pads 29 and 30 placed side by side with pairs of the links 32 bridging the gaps therebetween. The links 32 are so constructed that the heads 40-a and 40-b thereof may be inserted into the slots 37 and 37-a in such a manner that the heads 40-a and 40-b may be secured within and behind the upstanding ends 33 and 34 of the pads 29 and 30.

Thus, an endless chain of such pads and links may be fabricated and assembled around the wheels 21 and 22.

The method of assembling the endless-track of the present invention is as follows. With a pad 29 held so that the parallel ends 33 and 34 are pointing in a downward direction, a second pad 29 is suspended directly above the first pad so that parallel ends 33 and 34 are pointing upward. This procedure is shown particularly in Figure 6. The slots of the upper pad are directly above the slots of the lower pad. The distance between pads should be slightly less than the length of the shank 39 of a connector link 32. A link may then be inserted in a pair of aligned slots 37 in such a manner that the ends 40-a and 40-b are inside the body portion 38 of the pads 29. When the link is pushed as far toward the center of the pads as it will go in the slots 37, the outer tip of each of the ends 40-a and 40-b will be inside the upturned ends 35 and 36 of the pads 29. Then the link may be given a quarter turn, as is shown by the right-hand link in Figure 6, so that each of the ends 40-a and 40-b of the link is caught behind the upturned flange.

When two of the links have then been assembled, as shown in Figure 6, the uppermost pad may be swung forward and downward so that the edges 35 and 36 of the flanges 33 and 34 point downward. Thereafter, another pad may be inverted above this second pad and two more links assembled in the same fashion as heretofore described. Thus, a chain of pads and links can be assembled as is shown particularly in Figure 3.

The purpose of the T-shaped slots in the master pad 30 will now be described. When a sufficient number of pads and links have been assembled so that only one more pad is required to form the necessary length of endless-track required to pass around and between the wheels 21 and 22, the master pad 30 is assembled to the last pad in the chain with the links placed within the slots 37 rather than the T-shaped slots 37-a of the master pad. When the master pad is swung forward and downward, these T-shaped slots will be in such a position that two links may be dropped into the slots 37-a without the necessity of inverting the pad 30 or twisting the next succeeding links 32. This assembled chain of pads and links may be dropped over and around the wheels 21 and 22 with the center of said chain approximately midway between the axles 27 and 28 in a line with the upper edges of the wheels 21 and 22. The rest of the chain can be wrapped around the wheels 21 and 22 with the edges A and B of the pads 29 engaging the teeth 31 of the wheels and with the links 32 passing said teeth between said wheels, as is particularly shown in Figures 2 and 5. This will bring the first-mentioned pad 29 (referred to in connection with Figure 6) somewhat adjacent the last-mentioned master pad 30, in a position similar to that shown in Figure 3. The first and last pads are then brought closer together by decreasing the tension on the chain; either by decreasing the distance between the axles 27 and 28 or in any method provided in the vehicle on which the endless chain will be installed. This brings the heads 40-a of the two last-assembled links over the top of the master pad 30 with the heads 40-a of the links lying above the "heads" 37-b of the T-shaped slots 37-a.

The heads 40-a may then be dropped into the slots 37-a without the necessity of twisting or turning either pads or links.

Thereafter, the tension in the chain may be increased, so as to tighten the endless-track 20 and bring the heads 40-a and 40-b of each and every link into tight contact with the upstanding ends 33 and 34 of the pads to which they are adjoined. In this manner, the heads 40-a of the two last-assembled links will be held against the flange 35 and away from the slots 37-b of the master pad 30, and thus these links cannot become disengaged from the master pad 30 unless the distance between the first and last-assembled pads is decreased.

This method of assembly provides for ease in replacing any worn or damaged pads 29 or 30 after the endless-track of the present invention has been in operation for a while.

To remove the track so as to replace a worn pad, it is necessary only to decrease the distance between the end 35 of pad 30 and the adjoining pad 29. This permits the links to be slipped out of the T-shaped slots 37-a in the master pad 30, disengaging the entire endless-track 20 and allowing it to be removed from the wheels 21 and 22. Thereafter, any given link or pad can be removed by merely following, in inverse order, the procedure described above.

The endless-track of the present invention is superior to any endless-track heretofore used because it does not require the use of threaded bolts and nuts to connect the pads. The bolted arrangements previously used were ineffective and difficult to handle because the threaded bolts became damaged and worn as the endless-track was used, thus making it exceedingly difficult to remove said bolts and nuts when it became necessary to replace a worn pad or connector-bolt.

The present invention may be embodied in other specific forms without departing from the spirit or essential attributes thereof, and it is therefore desired that the present embodiment be considered in all respects as illustrative and not restrictive, reference being had to the appended claims rather than to the foregoing description to indicate the scope of the invention.

Having described my invention, the following is hereby claimed and desired to be protected by Letters Patent:

1. An endless-track tread-construction for mobile units comprising a plurality of ground-contacting pads, each pad being integrally constructed of a single piece of form-retaining sheet-metal or the like having a main generally flat body portion and having a pair of outwardly-directed ground-gripping cleats formed at opposite ends of the body portion, said cleats being separated from the body portion by generally parallel transversely-extending fold-lines, each pad having one or more slots extending across each of said fold-lines so as to be disposed partly on the body-portion and partly on the cleat, and a plurality of metal links each detachably engaged intermediate the slots of successive pads and serving releasably to connect said pads in articulated spaced-apart circumferentially-distributed relationship.

2. A construction according to claim 1 wherein each of said links is provided with transversely-enlarged end-portions constructed and arranged to extend along and in contact with the fold-lines of the pads when in engaged position, said links being constructed and arranged to be axially rotated when slackened so as to bring the transversely-enlarged end-portions into alignment with the slots to permit attachment and detachment thereof.

3. A construction according to claim 1 wherein each of said links is generally H-shaped with the connecting arm of the H extending intermediate adjoining pads and with the parallel arms of the H underlying the fold-lines of said adjoining pads, in generally parallel juxtaposed relationship with said fold-lines, said links being constructed and arranged to be rotated a quater-turn so as to bring the parallel arms of the H into alignment with the slots and thereby to permit ready attachment and detachment thereof.

4. An endless-track tread-construction for mobile units comprising a plurality of ground-contacting pads, each pad being integrally constructed of a single piece of form-retaining sheet-metal or the like having a main generally flat body-portion and having a pair of outwardly-directed ground-gripping cleats formed at opposite ends of the body portion, said cleats being separated from the body-portion by generally parallel transversely-extending fold-lines, each pad having one or more slots extending across each of said fold-lines so as to be disposed partly on the body-portion and partly on the cleat, the slots extending in straight lines longitudinally along the body-portions of most of the pads, the slots of at least one pad being generally T-shaped with the head of the T extending transversely along the body-portion and spaced somewhat inward from the fold-line, and a plurality of integrally-formed generally H-shaped links of metal or the like, each detachably engaged intermediate the slots of adjoining pads and serving releasably to connect said pads in articulated spaced-apart circumferentially-distributed relationship, the parallel arms of the H underlying the fold-lines of said adjoining pads in generally parallel juxtaposed relationship with said fold-lines.

5. A construction according to claim 1 wherein each of said links is generally H-shaped with the connecting arm of the H extending intermediate adjoining pads and with the parallel arms of the H underlying the fold-lines of said adjoining pads, in generally parallel juxtaposed relationship with said fold-lines, and wherein the slots extend in straight lines longitudinally along the body-portions of most of the pads, and wherein the slots of at least one pad are generally T-shaped, with the head of the T extending transversely along the body-portion and spaced somewhat inward from the fold-line; the endless track being constructed and arranged to be assembled by first positioning individual pads in back-to-back relationship with their main body-portions in parallel spaced-apart position and with the cleats oppositely directed, and by then positioning the H-shaped links so that their parallel arms are in alignment with the cleat portions of the slots of the two pads and by then inserting the links within the slots and rotating them a quarter-turn so that their parallel arms extend transversely and parallel to the fold-lines and by then positioning the pads so that their body portions are disposed in generally the same plane with the cleats extending in the same direction, the pads being formed into a more or less continuous annulus by inserting the last H-shaped links into the T-shaped slots and thereafter spreading the pads circumferentially.

RUSSELL J. GRAY.

REFERENCES CITED

The following references are of record in the file of this patent:

UNITED STATES PATENTS

| Number | Name | Date |
|---|---|---|
| 1,326,331 | Faso | Dec. 30, 1919 |

FOREIGN PATENTS

| Number | Country | Date |
|---|---|---|
| 450,166 | Great Britain | July 13, 1936 |